(12) United States Patent
Lee et al.

(10) Patent No.: US 8,486,557 B2
(45) Date of Patent: Jul. 16, 2013

(54) BATTERY MODULE OF IMPROVED WELDING RELIABILITY AND BATTERY PACK EMPLOYED WITH THE SAME

(75) Inventors: Jin Kyu Lee, Busan (KR); Yong Shik Shin, Daejeon (KR); HeeSoo Yoon, Daejeon (KR); BumHyun Lee, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/410,500

(22) Filed: Mar. 2, 2012

(65) Prior Publication Data

US 2012/0183840 A1    Jul. 19, 2012

Related U.S. Application Data

(63) Continuation of application No. PCT/KR2011/000394, filed on Jan. 19, 2011.

(30) Foreign Application Priority Data

Feb. 9, 2010   (KR) ........................ 10-2010-0011754

(51) Int. Cl.
*H01M 6/42*        (2006.01)
*H01M 2/24*        (2006.01)

(52) U.S. Cl.
USPC ............................ 429/149; 429/158; 429/160

(58) Field of Classification Search
USPC ................. 429/149, 156, 157, 158, 159, 160, 429/123, 99; 320/126, 112
See application file for complete search history.

(56) References Cited

U.S. PATENT DOCUMENTS

| 8,318,346 B2 * | 11/2012 | Kim et al. ................... 429/211 |
| 2002/0119367 A1 | 8/2002 | Watanabe et al. |
| 2006/0194101 A1 * | 8/2006 | Ha et al. ........................ 429/158 |
| 2011/0151306 A1 * | 6/2011 | Takamatsu ................... 429/120 |

FOREIGN PATENT DOCUMENTS

| JP | 2002-252023 A | 9/2002 |
| JP | 2007-258014 A | 10/2007 |
| KR | 10-2009-0010444 A | 1/2009 |
| KR | 10-2009-0093222 A | 9/2009 |

OTHER PUBLICATIONS

International Search Report issued in PCT/KR2011/000394, dated Sep. 7, 2011.

* cited by examiner

*Primary Examiner* — Raymond Alejandro
(74) *Attorney, Agent, or Firm* — Birch, Stewart, Kolasch & Birch, LLP

(57) ABSTRACT

Disclosed herein is a battery module including a plurality of sequentially stacked plate-shaped battery cells, wherein the battery module is configured to have a structure in which two or more cell units are stacked in a state in which the battery cells are electrically connected to each other, each of the cell units is configured to have a structure in which two or more battery cells are connected in parallel to each other in a state in which the battery cells are in tight contact with each other, and parallel connection between electrode terminals of the battery cells of the cell units is achieved by one to one welding at a single weld point.

18 Claims, 6 Drawing Sheets

BATTERY MODULE OF IMPROVED WELDING RELIABILITY AND BATTERY PACK EMPLOYED WITH THE SAME

CROSS REFERENCE TO RELATED APPLICATIONS

This application is a Continuation of PCT International Application No. PCT/KR2011/000394 filed on Jan. 19, 2011, which claims priority under 35 U.S.C. §119(a) to Patent Application No. 10-2010-0011754 filed in the Republic of Korea on Feb. 9, 2010, all of which are hereby expressly incorporated by reference into the present application.

TECHNICAL FIELD

The present invention relates to a battery module with improved welding reliability and a middle or large-sized battery pack including the same, and, more particularly, to a battery module including a plurality of sequentially stacked plate-shaped battery cells, wherein the battery module is configured to have a structure in which two or more cell units are stacked in a state in which the battery cells are electrically connected to each other, each of the cell units is configured to have a structure in which two or more battery cells are connected in parallel to each other in a state in which the battery cells are in tight contact with each other, and parallel connection between electrode terminals of the battery cells of the cell units is achieved by one to one welding at a single weld point.

BACKGROUND ART

Secondary batteries, which can be charged and discharged, have been widely used as energy sources for wireless mobile devices. Also, secondary batteries have attracted considerable attention as power sources for devices which require high power output and large capacity, including electric vehicles (EV), hybrid electric vehicles (HEV) and plug-in hybrid electric vehicles (Plug-In HEV), which have been developed to solve problems, such as air pollution, caused by existing gasoline and diesel vehicles using fossil fuels.

Such devices use a middle or large-sized battery module having a plurality of battery cells electrically connected to each other to provide high power output and large capacity.

The middle or large-sized battery module is preferably manufactured so as to have as small a size and weight as possible. For this reason, a prismatic battery or a pouch-shaped battery, which can be stacked with high integration and has a small weight to capacity ratio, is usually used as a battery cell (unit cell) of the middle or large-sized battery module. In particular, much interest is currently focused on the pouch-shaped battery, which uses an aluminum laminate sheet as a sheathing member, because the weight of the pouch-shaped battery is low, the manufacturing costs of the pouch-shaped battery are low, and it is easy to modify the shape of the pouch-shaped battery.

FIG. 1 is a perspective view typically illustrating a conventional pouch-shaped battery. A pouch-shaped battery 10 shown in FIG. 1 is configured to have a structure in which two electrode terminals 11 and 12 protrude from the upper and lower ends of a battery body 13, respectively, while the electrode terminals 11 and 12 are opposite to each other. A sheathing member 14 includes upper and lower sheathing parts. That is, the sheathing member 14 is a two-unit member. An electrode assembly (not shown) is received in a receiving part which is defined between the upper and lower sheathing parts of the sheathing member 14. Opposite sides 14a and upper and lower ends 14b and 14c, which are contact regions of the upper and lower sheathing parts of the sheathing member 14, are bonded to each other, whereby the pouch-shaped battery 10 is manufactured.

The sheathing member 14 is configured to have a laminate structure of a resin layer/a metal film layer/a resin layer. Consequently, it is possible to bond the opposite sides 14b and the upper and lower ends 14a and 14c of the upper and lower sheathing parts of the sheathing member 14, which are in contact with each other, to each other by applying heat and pressure to the opposite sides 14a and the upper and lower ends 14b and 14c of the upper and lower sheathing parts of the sheathing member 14 so as to weld the resin layers thereof to each other. According to circumstances, the opposite sides 14a and the upper and lower ends 14b and 14c of the upper and lower sheathing parts of the sheathing member 14 may be bonded to each other using a bonding agent. For the opposite sides 14a of the sheathing member 14, the same resin layers of the upper and lower sheathing parts of the sheathing member 14 are in direct contact with each other, whereby uniform sealing at the opposite sides 14a of the sheathing member 14 is accomplished by welding. For the upper end 14b and the lower end 14c of the sheathing member 14, on the other hand, the electrode terminals 11 and 12 protrude from the upper end 14b and the lower end 14c of the sheathing member 14, respectively. For this reason, the upper and lower ends 14b and 14c of the upper and lower sheathing parts of the sheathing member 14 are thermally welded to each other, while a film type sealing member 16 is interposed between the electrode terminals 11 and 12 and the sheathing member 14, in consideration of the thickness of the electrode terminals 11 and 12 and the difference in material between the electrode terminals 11 and 12 and the sheathing member 14, so as to increase sealability of the sheathing member 14.

However, the mechanical strength of the sheathing member 14 is low. In order to manufacture a battery module having a stable structure, therefore, battery cells (unit cells) are generally mounted in a pack case, such as a cartridge. However, an apparatus or a vehicle, in which a middle or large-sized battery module is installed, has a limited installation space. For this reason, the space utilization is lowered if the size of the battery module is increased as the result of using the pack case, such as the cartridge. Also, the battery cells repeatedly expand and contract during the charge and discharge of the battery cells due to the low mechanical strength of the battery cells with the result that the thermally welded portions may be separated from each other.

In addition, the electrode terminals 11 and 12 of the pouch-shaped battery 10 have a larger area and a smaller thickness than the electrode terminals of the cylindrical battery or the prismatic battery with the result that electrical connection may be restricted during the configuration of the battery module or the battery pack.

Meanwhile, the battery module mounted in the middle or large-sized battery pack is generally manufactured by stacking a plurality of battery cells with high integration. Electrode terminals of the neighboring battery cells are electrically connected to each other.

FIG. 2 is a perspective view typically illustrating the electrical connection structure of a conventional battery module.

Referring to FIG. 2, a battery module 50 is configured to have a structure in which cell units 20 are connected in series to each other while the cell units 20 are stacked. In particular, every two battery cells 10 are connected in series to each other while an electrically insulative partition 15 is disposed between every two battery cells 10.

As a result, electrode terminals of the battery module are connected to each other by one to one welding at a single weld point.

When the cell units are connected in parallel to each other while being stacked, however, three or more connections between the electrode terminals are needed with the result that the structure of the battery module becomes complicated, and internal resistance increases when the same region is welded.

Consequently, there is a high necessity for a battery module that is capable of providing high power output and large capacity and minimizing internal resistance while maintaining welding reliability.

DISCLOSURE

Technical Problem

Therefore, the present invention has been made to solve the above problems, and other technical problems that have yet to be resolved.

Specifically, it is an object of the present invention to provide a battery pack configured to have a structure in which battery cells of cell units which are connected in series to each other are electrically connected in parallel to each other so as to provide large capacity, the parallel connection is achieved by one to one welding at a single weld point, whereby a battery module including electrode terminals and bus bars configured in various shapes is provided, and internal resistance of the battery pack is minimized.

It is another object of the present invention to provide a battery cell unit that is capable of minimizing the increase in weight and size thereof while effectively increasing mechanical strength of battery cells.

Technical Solution

In accordance with one aspect of the present invention, the above and other objects can be accomplished by the provision of a battery module including a plurality of sequentially stacked plate-shaped battery cells (hereinafter, referred to as battery cells), wherein the battery module is configured to have a structure in which two or more cell units are stacked in a state in which the battery cells are electrically connected to each other, each of the cell units is configured to have a structure in which two or more battery cells are connected in parallel to each other in a state in which the battery cells are in tight contact with each other, and parallel connection between electrode terminals of the battery cells of the cell units is achieved by one to one welding at a single weld point.

Generally, a battery module is configured so that cell units are stacked in a state in which the cell units are connected in series to each other. Electrode terminals of the cell units are welded to each other by one to one welding, or the electrode terminals of the cell units are welded to bus bars by one to one welding. In a case in which parallel connection between the cell units is achieved in consideration of the capacity of a battery module, however, welding is performed at the same regions during welding between the electrode terminals or between the electrode terminals and the bus bars with the result that internal resistance at the welded portions increases.

In the battery module according to the present invention, on the other hand, the cell units are connected in series to each other, the battery cells of each of the cell units are connected in parallel to each other, and the parallel connection between the electrode terminals of the battery cells is achieved by one to one welding, thereby minimizing internal resistance at the welded portions while increasing the capacity of the battery module. Also, in this structure, the number of voltage measurement portions of a battery management system (BMS) is greatly reduced as compared with the number of the battery cells, thereby effectively reducing the manufacturing costs of a battery pack.

Preferably, each of the battery cells is a plate-shaped secondary battery, which has a small thickness and a relatively large width and length so that the total size of the battery module is minimized when the battery cells are stacked to constitute the battery module. A preferred example of such a secondary battery may be configured so that an electrode assembly of a cathode/separator/anode structure is mounted in a battery case formed of a laminate sheet including a resin layer and a metal layer, and a cathode terminal and an anode terminal protrude from opposite ends of the battery case. Specifically, the electrode assembly may be mounted in a pouch-shaped case formed of an aluminum laminate sheet. A secondary battery configured to have the above structure may also be referred to as a 'pouch-shaped battery cell.'

In a preferred example, each of the cell units may be configured to have a structure in which the battery cells are mounted in metal housings in a state in which the battery cells are in tight contact with each other.

In the above structure, the metal housings may be coupled to each other so as to cover the two or more battery cells in a manner of covering the entire outside of the battery cell stack excluding the cathode and anode terminals of the battery cells. Consequently, the metal housings protect the battery cells, which have low mechanical strength, and restrain the change in repetitive expansion and contraction during charge and discharge of the battery cells, thereby preventing sealing portions of the battery cells from being separated from each other.

Specifically, the metal housings may have inside structures corresponding to the shape of the outside of the battery cell stack, and, in particular, the metal housings may be configured to be coupled to each other in an assembly coupling manner which does not need an additional coupling member. As a representative example, sectional coupling parts of the metal housing may be configured to have a male and female coupling structure in which the metal housings are engaged with each other by elastic coupling when the metal housings are pressed in a state in which the metal housings are in contact with each other so that the metal housings face each other.

Meanwhile, heat is generated from a secondary battery during charge and discharge of the secondary battery. It is important to effectively discharge the heat generated from the secondary battery to the outside so as to increase the lifespan of the secondary battery and secure safety of the secondary battery. Preferably, therefore, each of the metal housings is formed of a metal sheet exhibiting high thermal conductivity, by which the heat generated from the battery cells is more easily discharged to the outside.

In a preferred example, each of the cell units may be configured to have a structure in which battery cells are connected in parallel to each other. For example, each of the cell units may include two battery cells.

In this case, the parallel connection between the battery cells of each of the cell units may be achieved by welding one end of an electrode terminal of a first battery cell to one side of an electrode terminal of a second battery cell in a tight contact fashion in a state in which the end of the electrode terminal of the first battery cell is bent twice.

Also, the series connection between the cell units may be achieved by bending one end of an electrode terminal of a first cell unit and one end of an electrode terminal of a second cell unit into a ']' shape and welding overlap portions of the first cell unit and the second cell unit.

Consequently, the electrical connection between the electrode terminals is achieved through the series connection and the parallel connection in a state in which weld points are located at the bent portions of the ends of the electrode terminals, thereby effectively reducing internal resistance.

As an example, an electrode terminal of an outermost one of the cell units may be welded to an external input and output terminal by one to one welding at a single weld point. In this case, one end of an electrode terminal of a first battery cell is welded to one side of an electrode terminal of a second battery cell in a tight contact fashion in a state in which the end of the electrode terminal of the first battery cell is bent twice, as previously described, and the external input and output terminal is connected to the electrode terminal of the second battery cell at a position distant from the weld point between the electrode terminals.

Meanwhile, the series connection between the cell units and the parallel connection between the battery cells are simultaneously achieved using a bus bar so that the series connection between the cell units and the parallel connection between the battery cells are performed by one to one welding at a single weld point.

In particular, in a case in which each of the battery cells includes electrode terminals made of an aluminum material, it is possible to maintain higher strength when the cell units are connected to each other using the bus bar since the aluminum material exhibits more excellent physical properties and ductility than a copper material even through the thickness of the aluminum material is small.

Also, in a case in which a battery pack including the bus bars is manufactured, voltage is measured through the respective bus bars. Consequently, it is possible to reduce the number of voltage measurement portions of the BMS as compared with the number of the battery cells. In addition, it is possible to manufacture a battery pack with a more compact structure.

In a preferred example, the bus bar may include a middle series welding part for series connection between the cell units and a pair of side parallel welding parts for parallel connection between the battery cells, the side parallel welding parts extending from opposite sides of the middle series welding part.

The structure of the bus bar is not particularly restricted so long as the electrode terminals can be connected to each other by one to one welding. For example, the bus bar may be formed of a strip-shaped sheet, and the bus bar may be configured to have a structure in which the side parallel welding parts are bent upward from the middle series welding part. Consequently, the electrode terminals are connected to the middle series welding part and the side parallel welding parts, which are spaced from each other, thereby minimizing internal resistance at the connection portions.

Also, openings may be formed between the middle series welding part and the side parallel welding parts so that the electrode terminals are inserted through the opening, and therefore, the electrode terminals are sequentially connected to each other in a state in which the electrode terminals are stacked as needed in the series connection between the electrode terminals.

In a concrete example, the electrode terminal of the first cell unit is welded to the top or bottom of the middle series welding part, and the electrode terminal of the second cell unit is welded to the bottom or the top of the middle series welding part. That is, the electrode terminals are welded to the top and the bottom of the middle series welding part while the electrode terminals do not overlap each other, and therefore, the sequential welding of the electrode terminals is easily achieved and internal resistance at the welded portions is minimized. For example, when the electrode terminal of the first cell unit is welded to the top of the middle series welding part, the electrode terminal of the second cell unit is welded to the bottom of the middle series welding part. According to circumstances, all of the electrode terminals may be located at the same side of the middle series welding part so long as the electrode terminals do not overlap each other.

Meanwhile, a middle or large-sized battery pack uses a plurality of battery cells so as to secure a high power output and large capacity. Consequently, battery modules constituting the battery pack require higher installation efficiency, higher structural stability and higher heat dissipation efficiency to secure safety in a limited installation space.

In accordance with another aspect of the present invention, therefore, there is provided a middle or large-sized battery system manufactured by combining battery modules based on desired power output and capacity.

A middle or large-sized battery system according to the present invention may be manufactured by combining battery packs based on desired power output and capacity. The middle or large-sized battery system according to the present invention is preferably used in electric vehicles, hybrid electric vehicles, electric motorcycles, or electric bicycles, which have a limited installation space and are exposed to frequent vibration and strong impact in consideration of installation efficiency and structural stability as previously described.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
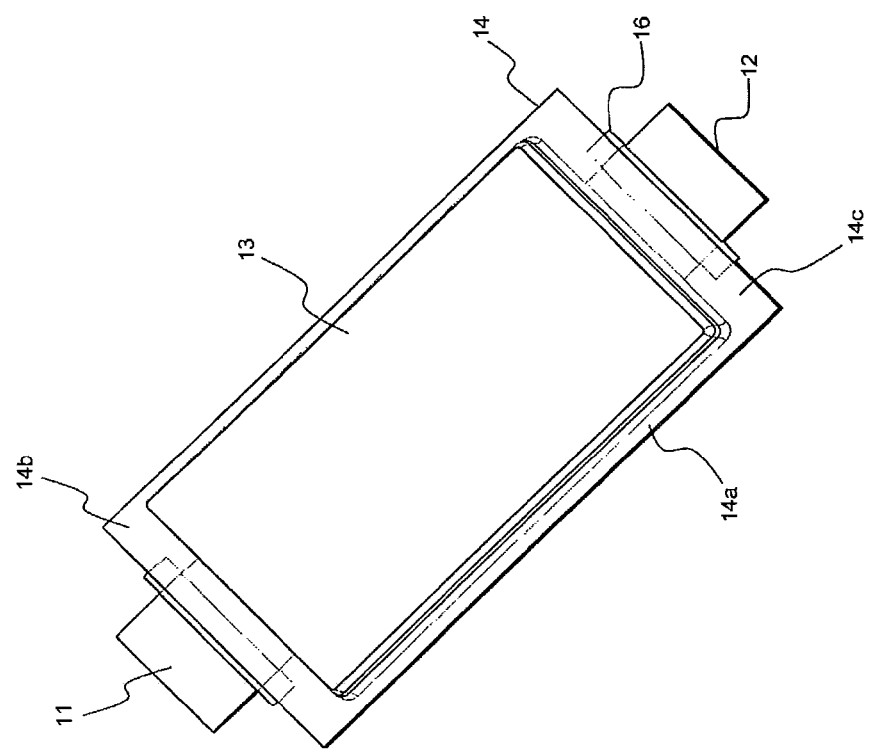
FIG. 1 is a perspective view illustrating a conventional pouch-shaped battery.
Figure 2:
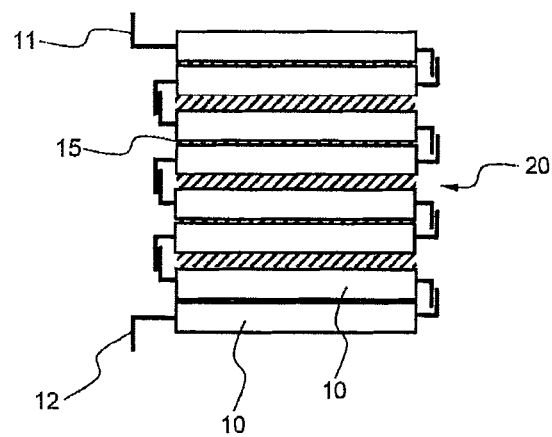
FIG. 2 is a perspective view illustrating the electrical connection structure of a conventional battery module.
Figure 3:
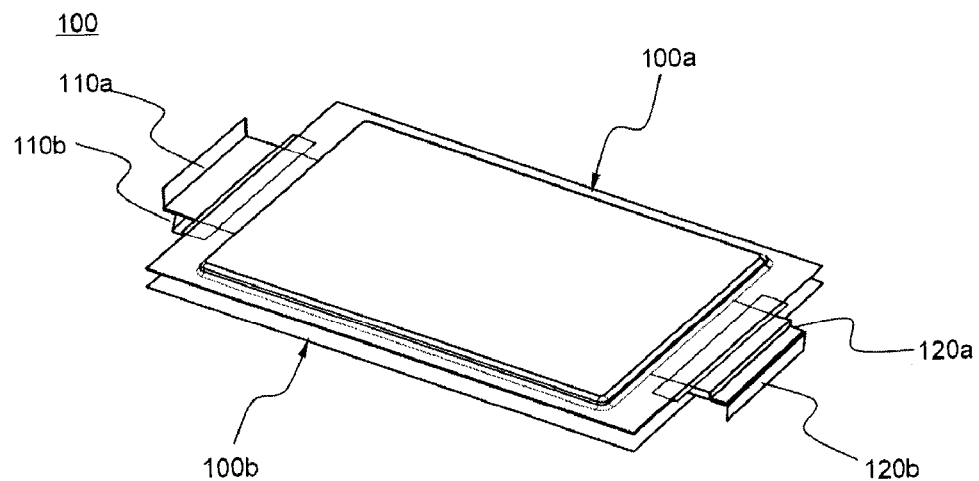
FIG. 3 is a perspective view illustrating parallel connection of battery cells according to an embodiment of the present invention.

FIG. 3 is a perspective view illustrating parallel connection of battery cells according to an embodiment of the present invention.

Referring to FIG. 3, cathode terminals 110a and 110b and anode terminals 120a and 120b of a first battery cell 100a and a second battery cell 100b, which are pouch-shaped battery cells, are welded to each other so that the cathode terminals 110a and 110b and the anode terminals 120a and 120b of the first battery cell 100a and the second battery cell 100b are connected in parallel to each other in a state in which the first battery cell 100a and the second battery cell 110 are stacked so that the cathode terminals 110a and 110b and the anode terminals 120a and 120b of the first battery cell 100a and the second battery cell 100b overlap.

The parallel connection between the battery cells 100a and 100b is achieved by welding one end of the anode terminal 120a of the first battery cell 100a to one side of the anode terminal 120b of the second battery cell 100b in a tight contact fashion in a state in which the end of the anode terminal 120a of the first battery cell 100a is bent twice. The details of the parallel connection between the battery cells 100a and 100b will be described below in more detail with reference to FIGS. 7 and 8.

Figure 4:
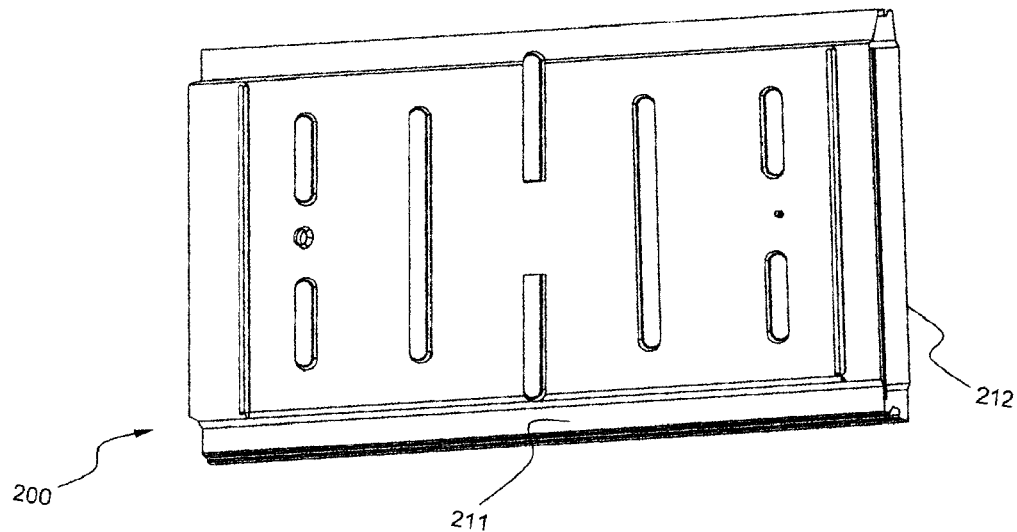
FIGS. 4 to 6 are typical views illustrating a series of processes for assembling a cell unit.
Figure 5:
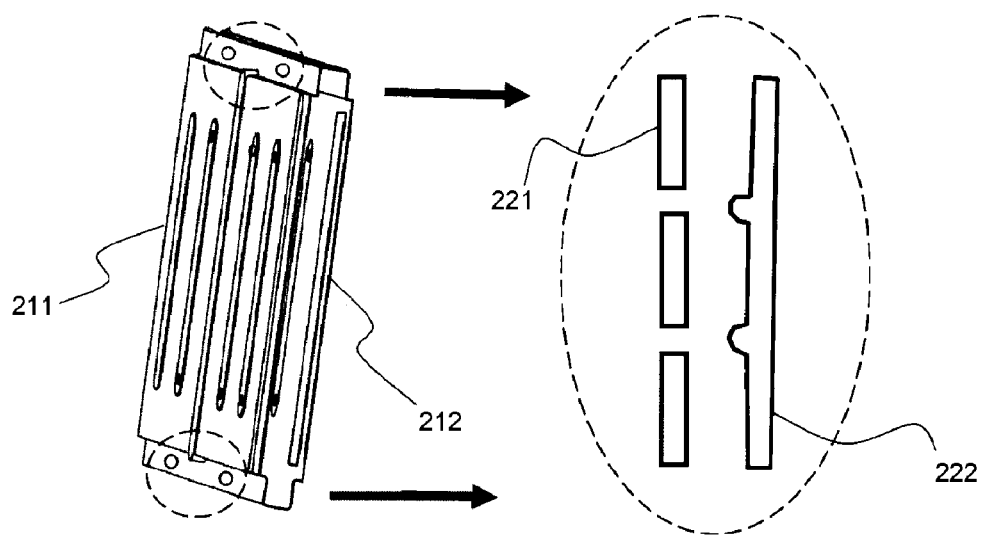
Figure 6:
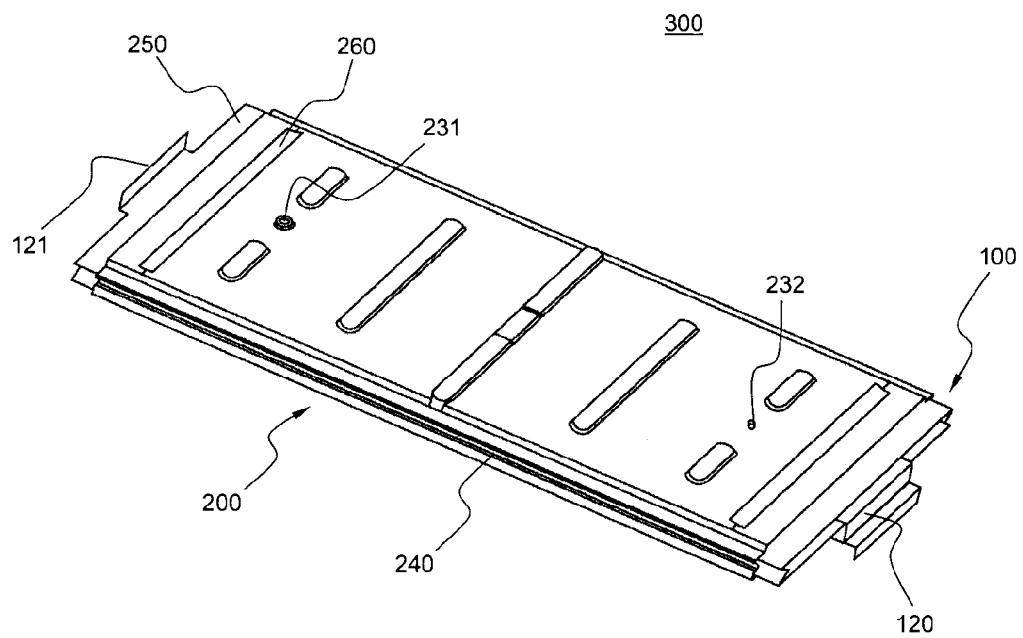

FIGS. 4 to 6 are typical views illustrating a series of processes for assembling an exemplary cell unit.

Referring to these drawings together with FIG. 3, there is shown a pair of high-strength metal housings 200 to cover the entire outside of a battery cell stack 100. The metal housings 200 protect the battery cells 100a and 100b, which have low mechanical strength, and restrain the change in repetitive expansion and contraction during charge and discharge of the battery cells 100a and 100b, thereby preventing sealing portions of the battery cells 100a and 100b from being separated from each other. The metal housings 200 include a left housing part 211 and a right housing part 212. The metal housings 200 may be coupled to each other without using an additional fixing member.

The coupling structure of the metal housings 200 is shown in detail in FIG. 5. FIG. 5 is a sectional view of the metal housings 200 with a partially enlarged view of the metal housings 200. Referring to FIG. 5, the metal housings 200 are configured to have a male and female coupling structure 221 and 222 in which the metal housing parts 211 and 212 are engaged with each other by elastic coupling when the metal housing parts 211 and 212 are pressed in which in a state in which the metal housing parts 211 and 212 are in contact with each other so that the metal housing parts 211 and 212 face each other. Consequently, it is possible to achieve strong mechanical coupling between the metal housings 200 without using an additional coupling member or an additional assembly process to assemble the metal housings 200. Such a simple coupling method is preferably applicable to mass production.

FIG. 6 is a perspective view illustrating a cell unit according to an embodiment of the present invention.

Referring to FIG. 6, a cell unit 300 is configured so that the outside of a battery cell stack 100 is covered by a pair of metal housings 200 to reinforce mechanical properties of battery cells. Cathode terminals 121 and the anode terminals 120 of the battery cells are connected in parallel to each other by welding. To this end, the cathode terminals 121 and the anode terminals 120 of the battery cells are bent in a step shape.

The metal housings 200 are formed of high-strength metal sheets which are coupled to each other so as to cover the outside of the battery cell stack excluding the electrode terminals of the battery cells. The metal housings 200 are provided at the left and right sides thereof with step parts 240, by which a module is easily fixed. Also, the metal housing 200 are provided at the upper and lower ends thereof with step parts 250 to perform the same function. In addition, the metal housings 200 are provided at the upper and lower ends thereof with longitudinal fixing parts 260, by which the module is easily mounted. A plurality of linear protrusions, arranged at intervals in the lateral direction, is formed at the outsides of the metal housings 200. Projections 231 and 232, which are formed in opposite shapes, are formed at the upper end protrusion and the lower end protrusion, respectively.

Figure 7:
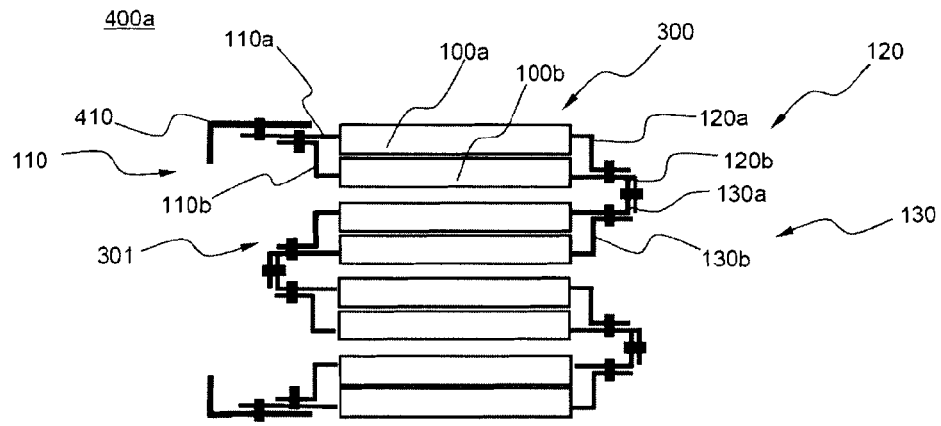
FIG. 7 is a typical view illustrating the electrical connection structure of a battery module according to an embodiment of the present invention including cell units coupled to each other.

FIG. 7 is a typical view illustrating an exemplary battery module 400a in which cell units 300, 301 . . . are stacked.

Referring to FIG. 7 together with FIG. 3, four cell units 300, 301 . . . constitute a battery module 400a. The battery module 400a includes a total of 8 battery cells.

The cell units 300, 301 . . . are connected in series to each other in a state in which the cell units 300, 301 . . . are stacked. In the cell unit 300, two battery cells 100a and 100b are connected in parallel to each other.

Here, the parallel connection between the battery cells 100a and 100b is achieved by welding one end of an anode terminal 120a of the first battery cell 100a to one side of an anode terminal 120b of the second battery cell 100b in a tight contact fashion in a state in which the end of the anode terminal 120a of the first battery cell 100a is bent twice, as previously described.

Also, the series connection between the cell units 300 and 301 is achieved by bending one end of an anode terminal 120 (corresponding to the electrode terminal 120b of the second battery cell) of the first cell unit 300 and one end of a cathode terminal 130 (corresponding to an electrode terminal 130a of a third battery cell) of the second cell unit 301 into a ']' shape and welding overlapping portions of the first cell unit 300 and the second cell unit 301.

Consequently, the connection between the electrode terminals 120a, 120b, 130a and 130b of the battery cells of the two cell units 300 and 301 is achieved by one to one welding at a single weld point 140, thereby maximally reducing internal resistance of the cell units.

Also, an external input and output terminal 410 is connected to the outermost first cell unit 300 at a position distant from the weld point between the electrode terminals 110a and 110b. Consequently, the electrode terminal 110 of the outermost first cell unit 300 is also connected to the external input and output terminal 410 by one to one welding at a single weld point.

Figure 8:
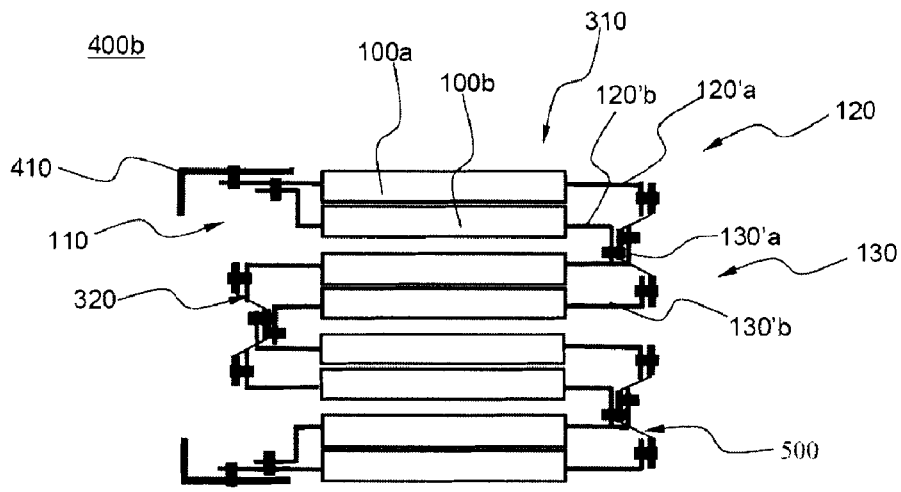
FIG. 8 is a typical view illustrating the electrical connection structure of a battery module in which cell units are connected to each other via bus bars.
Figure 9:
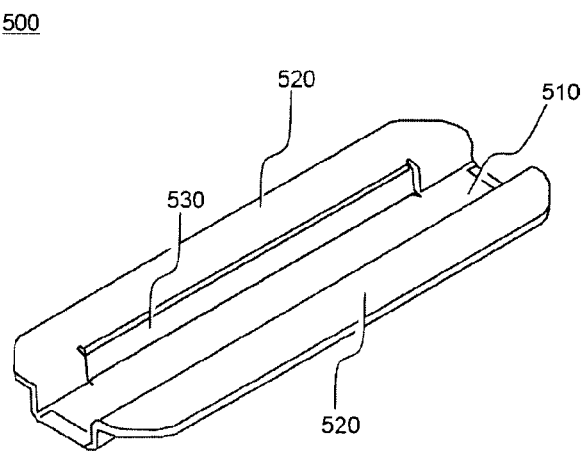
FIG. 9 is a perspective view illustrating one of the bus bars shown in FIG. 8.
Figure 10:
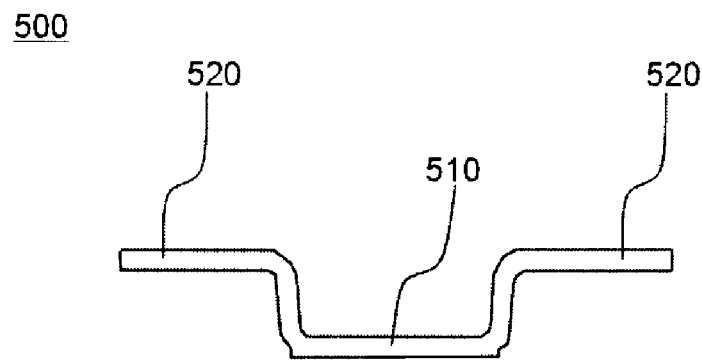
FIG. 10 is a front view illustrating one of the bus bars shown in FIG. 8.
Figure 11:
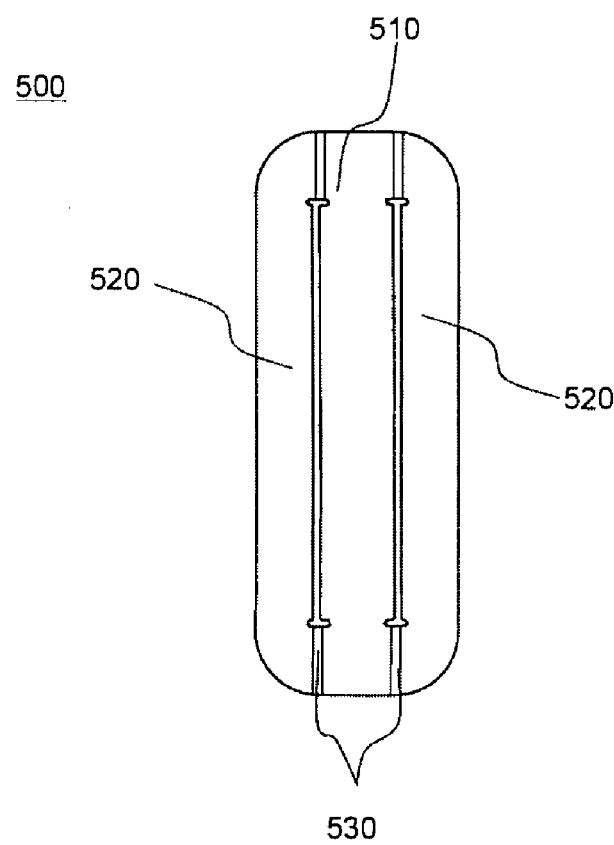
FIG. 11 is a plan view illustrating one of the bus bars shown in FIG. 8.
Figure 12:
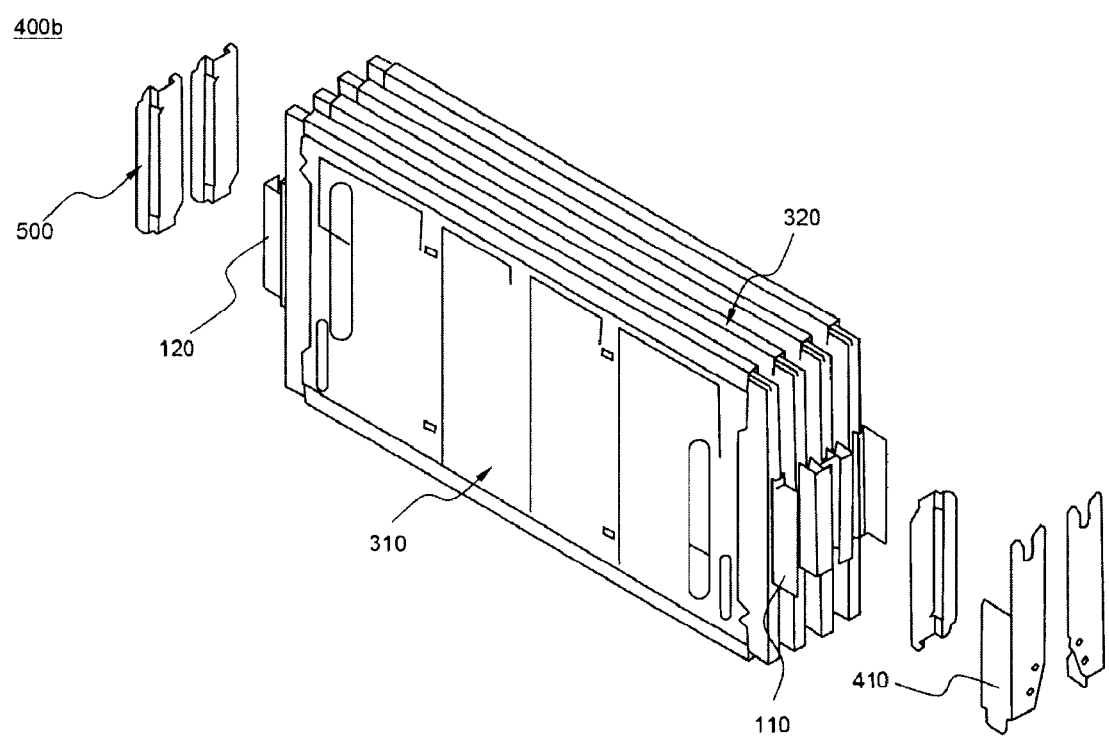
FIG. 12 is an exploded view of the battery module shown in FIG. 8.

FIG. 8 is a typical view illustrating a battery module 400b in which cell units 310, 320 . . . are connected to each other via bus bars 500. FIGS. 9 to 11 are typical views illustrating an exemplary bus bar. FIG. 12 is an exploded view of the battery module shown in FIG. 8.

Referring to these drawings, the battery module 400b is configured so that the series connection between the cell units 310, 320 . . . and the parallel connection between electrode terminals 120'a, 120'b, 130'a and 130'b are achieved using the bus bars 500 by one to one welding.

A bus bar 500 is formed of a strip-shaped sheet. The bus bar 500 includes a middle series welding part 510 for series connection between the cell units 310 and 320 and a pair of side parallel welding parts 520 for parallel connection between the battery cells 100a and 100b. The side parallel welding parts 520 extend from opposite sides of the middle series welding part 510.

Also, the bus bar 500 is configured to have a structure in which the side parallel welding parts 520 are bent upward from the middle series welding part 510. Openings 530 are formed between the middle series welding part 510 and the side parallel welding parts 520 so that electrode terminals to be sequentially connected to each other are inserted through the openings 530.

In the structure shown in FIG. 8, the anode terminal 120'b of the first cell unit 310 is welded to the bottom of the middle series welding part 510, and the cathode terminal 130'a of the second cell unit 320 is inserted through the opening 530 and is then welded to the top of the middle series welding part 510.

Using the bus bar configured to have the above structure, therefore, it is possible to insert the electrode terminals through the openings based on a desired structure, thereby achieving electrical connection and thus improving manufacturing process efficiency of the battery module.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module according to the present invention is configured so that the cell units, which minimizes the increase in weight and size of the battery module while effectively increasing low mechanical strength of the battery cells, are connected in series to each other, and the parallel connection between the electrode terminals of the battery cells of the cell units is achieved by one to one welding at a single weld point, thereby minimizing internal resistance and space restriction and thus improving manufacturing process efficiency of the battery module.

The invention claimed is:

1. A battery module comprising a plurality of sequentially stacked plate-shaped battery cells, wherein
   the battery module is configured to have a structure in which two or more cell units are stacked in a state in which the battery cells are electrically connected to each other,
   each of the cell units is configured to have a structure in which two or more battery cells are connected in parallel to each other in a state in which the battery cells are in tight contact with each other, and
   parallel connection between electrode terminals of the battery cells of the cell units is achieved by one to one welding at a single weld point.

2. The battery module according to claim 1, wherein each of the plate-shaped battery cells is configured so that an electrode assembly of a cathode/separator/anode structure is mounted in a battery case formed of a laminate sheet comprising a resin layer and a metal layer, and a cathode terminal and an anode terminal protrude from opposite ends of the battery case.

3. The battery module according to claim 1, wherein each of the cell units is configured to have a structure in which the battery cells are mounted in metal housings in a state in which the battery cells are in tight contact with each other.

4. The battery module according to claim 3, wherein the metal housings are coupled to each other so as to cover the two or more battery cells in a manner of covering the outside of the battery cell stack excluding cathode and anode terminals of the battery cells.

5. The battery module according to claim 4, wherein the metal housings have inside structures corresponding to the shape of the outside of the battery cell stack, and the metal housings have section coupling parts configured to be coupled to each other in an assembly coupling manner.

6. The battery module according to claim 5, wherein the section coupling parts are configured to have a male and female coupling structure in which the metal housings are engaged with each other by elastic coupling when the metal housings are pressed in which in a state in which the metal housings are in contact with each other so that the metal housings face each other.

7. The battery module according to claim 3, wherein each of the metal housings is formed of a metal sheet exhibiting thermal conductivity.

8. The battery module according to claim 1, wherein each of the cell units is configured to have a structure in which two battery cells are connected in parallel to each other.

9. The battery module according to claim 1, wherein the parallel connection between the battery cells is achieved by welding one end of an electrode terminal of a first battery cell to one side of an electrode terminal of a second battery cell in a tight contact fashion in a state in which the end of the electrode terminal of the first battery cell is bent twice.

10. The battery module according to claim 1, wherein the series connection between the cell units is achieved by bending one end of an electrode terminal of a first cell unit and one end of an electrode terminal of a second cell unit into a ']' shape, respectively, and welding overlap portions of the first cell unit and the second cell unit.

11. The battery module according to claim 1, wherein an electrode terminal of an outermost one of the cell units is welded to an external input and output terminal by one to one welding at a single weld point.

12. The battery module according to claim 1, wherein the series connection between the cell units and the parallel connection between the battery cells are simultaneously achieved using a bus bar.

13. The battery module according to claim 12, wherein the bus bar comprises a middle series welding part for series connection between the cell units and a pair of side parallel welding parts for parallel connection between the battery cells, the side parallel welding parts extending from opposite sides of the middle series welding part.

14. The battery module according to claim 13, wherein the bus bar is formed of a strip-shaped sheet, and the bus bar is configured to have a structure in which the side parallel welding parts are bent upward from the middle series welding part.

15. The battery module according to claim 14, wherein openings are formed between the middle series welding part and the side parallel welding parts so that the electrode terminals are inserted through the openings.

16. The battery module according to claim 13, wherein an electrode terminal of an upper stacked one of the cell units is welded to the top of the middle series welding part, and an electrode terminal of a lower stacked one of the cell units is welded to the bottom of the middle series welding part.

17. A battery pack comprising two or more battery modules according to claim 1, the number of the battery modules being set based on power output and capacity of the battery pack.

18. The battery pack according to claim 17, wherein the battery pack is used as a power source for electric vehicles, hybrid electric vehicles or plug-in hybrid electric vehicles.

* * * * *